(12) United States Patent
Kons et al.

(10) Patent No.: US 10,917,204 B2
(45) Date of Patent: Feb. 9, 2021

(54) MULTI-USER MULTIPLEXING OF ORTHOGONAL TIME FREQUENCY SPACE SIGNALS

(71) Applicant: Cohere Technologies, Inc., Santa Clara, CA (US)

(72) Inventors: Shachar Kons, Santa Clara, CA (US); Ronny Hadani, Santa Clara, CA (US); Yoav Hebron, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 19 days.

(21) Appl. No.: 16/273,482

(22) Filed: Feb. 12, 2019

(65) Prior Publication Data

US 2019/0173630 A1     Jun. 6, 2019

Related U.S. Application Data

(63) Continuation of application No. PCT/US2017/046604, filed on Aug. 11, 2017.
(Continued)

(51) Int. Cl.
*H04L 5/00* (2006.01)
*H04L 23/02* (2006.01)
(Continued)

(52) U.S. Cl.
CPC .............. *H04L 5/0005* (2013.01); *H04J 4/00* (2013.01); *H04L 5/0026* (2013.01);
(Continued)

(58) Field of Classification Search
CPC .......................... H04L 5/0005; H04L 5/0014
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CA | 2409192 A1 * | 12/2001 | ............ H04J 13/00 |
| CN | 1235720 A | 11/1999 | |

(Continued)

OTHER PUBLICATIONS

International Search Report and Written Opinion for International Application No. PCT/US2017/025797, dated Jun. 21, 2017, 6 pages.
(Continued)

*Primary Examiner* — Deepa Belur
(74) *Attorney, Agent, or Firm* — Perkins Coie, LLP

(57) ABSTRACT

A method for performing downlink transmissions from a transmitting device to multiple user devices using transmission resources from a multi-dimensional grid of resources is described. The method includes logically partitioning the transmission resources into multiple segments, assigning, to a given user device of the multiple user devices, transmission resources of one or more of the multiple segments, and performing, using at least some of the assigned transmission resources for the given user device, a downlink transmission using an orthogonal time frequency space (OTFS) transformation on data or signals to be transmitted to the given user device.

18 Claims, 13 Drawing Sheets

Related U.S. Application Data

(60) Provisional application No. 62/374,705, filed on Aug. 12, 2016.

(51) Int. Cl.
*H04W 72/04* (2009.01)
*H04J 4/00* (2006.01)
*H04W 72/12* (2009.01)
*G01S 7/41* (2006.01)

(52) U.S. Cl.
CPC .......... *H04L 5/0037* (2013.01); *H04L 5/0051* (2013.01); *H04L 23/02* (2013.01); *H04W 72/044* (2013.01); *H04W 72/121* (2013.01); *H04W 72/1278* (2013.01); *G01S 7/41* (2013.01); *H04L 5/0007* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0120356 A1* | 6/2005 | Mecheneau ........... G06F 9/5066 719/315 |
| 2005/0157778 A1 | 7/2005 | Trachewsket et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0124917 A1* | 5/2010 | Miller, II ............... H04B 7/024 455/422.1 |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0107733 A1* | 5/2013 | Yin ................... H04L 25/03891 370/252 |

(56) References Cited

U.S. PATENT DOCUMENTS

| | | | |
|---|---|---|---|
| 2013/0107791 A1* | 5/2013 | Oh | H04W 4/08 370/312 |
| 2013/0121497 A1 | 5/2013 | Smaragdis et al. | |
| 2013/0230010 A1 | 9/2013 | Kim et al. | |
| 2013/0260787 A1 | 10/2013 | Hashimoto | |
| 2013/0279627 A1 | 10/2013 | Wu et al. | |
| 2013/0315133 A1 | 11/2013 | Wang et al. | |
| 2014/0143639 A1 | 5/2014 | Loghin et al. | |
| 2014/0161154 A1 | 6/2014 | Hadani et al. | |
| 2014/0169385 A1 | 6/2014 | Hadani et al. | |
| 2014/0169406 A1 | 6/2014 | Hadani et al. | |
| 2014/0169433 A1 | 6/2014 | Hadani et al. | |
| 2014/0169436 A1 | 6/2014 | Hadani et al. | |
| 2014/0169437 A1 | 6/2014 | Hadani et al. | |
| 2014/0169441 A1 | 6/2014 | Hadani et al. | |
| 2014/0247803 A1 | 9/2014 | Arambepola et al. | |
| 2014/0348252 A1 | 11/2014 | Siohan et al. | |
| 2014/0364128 A1 | 12/2014 | Lee et al. | |
| 2015/0117395 A1 | 4/2015 | Hadani et al. | |
| 2015/0326273 A1 | 11/2015 | Rakib et al. | |
| 2015/0327085 A1 | 11/2015 | Hadani et al. | |
| 2015/0382231 A1 | 12/2015 | Jabbar et al. | |
| 2016/0043835 A1 | 2/2016 | Hadani et al. | |
| 2016/0135132 A1 | 5/2016 | Donepudi et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1 | 10/2016 | Tehrani et al. | |
| 2016/0380743 A1 | 12/2016 | Rakib | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |
| 2018/0054244 A1* | 2/2018 | Kim | H04B 7/065 |

FOREIGN PATENT DOCUMENTS

| | | |
|---|---|---|
| CN | 101682316 A | 3/2010 |
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

International Search Report and Written Opinion for International Application No. PCT/US2016/030259, dated Aug. 1, 2016, 13 pages.

Office Action for U.S. Appl. No. 15/152,464, dated Apr. 6, 2017, 10 pages.

Examination Report No. 1 for Australian Application No. 2013280487, dated May 2, 2016, 3 pages.

International Search Report and Written Opinion for International Application No. PCT/US2016/031928, dated Oct. 7, 2016, 10 pages.

Office Action for U.S. Appl. No. 15/188,946, dated May 8, 2017, 14 pages.

International Search Report and Written Opinion for International Application No. PCT/US2016/038584, dated Sep. 26, 2016, 8 pages.

Office Action for U.S. Appl. No. 15/187,668, dated Feb. 16, 2017, 6 pages.

International Search Report and Written Opinion for International Application No. PCT/US2016/031909, dated Aug. 11, 2016, 13 pages.

Office Action for U.S. Appl. No. 15/194,494, dated May 5, 2017, 16 pages.

International Search Report and Written Opinion for International Application No. PCT/US2016/039662, dated Nov. 29, 2016, 14 pages.

Office Action for U.S. Appl. No. 15/436,653, dated Jun. 2, 2017, 10 pages.

Office Action for U.S. Appl. No. 15/208,545, dated Aug. 21, 2017, 15 pages.

International Search Report and Written Opinion for International Application No. PCT/US2016/041940, dated Oct. 20, 2016, 8 pages.

Supplementary European Search Report for European Application No. 13768150.8, dated Oct. 30, 2015, 7 pages.

International Search Report and Written Opinion for International Application No. PCT/US2013/033652, dated Jun. 12, 2013, 8 pages.

International Search Report and Written Opinion for International Application No. PCT/US2015/041417, dated Oct. 1, 2015, 7 pages.

Office Action for U.S. Appl. No. 14/805,407, dated Dec. 14, 2016, 7 pages.

International Search Report and Written Opinion for International Application No. PCT/US2015/041420, dated Oct. 1, 2015, 6 pages.

Extended European Search Report for European Application No. 17840372.1, dated Mar. 26, 2020, 10 pages.

Cohere Technologies et al., "OTFS Modulation Waveform and Reference Signals for New Rat", 3GPP DRAFT; R1-163619, vol. RAN WG1, no. Busan, South Korea; Apr. 11, 2016-Apr. 15, 2016; Apr. 18, 2016 (Apr. 18, 2016); 15 pages.

Cohere Technologies et al., "Overview of OTFS Waveform for Next Generation RAT", 3GPP TSG RA WG1 Meeting #84-bis; R1-162929, Busan, South Korea, Apr. 11-15, 2016 3 pages.

Office Action for U.S. Appl. No. 13/117,119, dated Aug. 5, 2013, 5 pages.

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

(56) References Cited

OTHER PUBLICATIONS

Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network_html>, 5 pages.
Catt, "UL ACK/NACK transmission methods for LTE-A," 3GPP TSG RAN WG1 Meeting #60bis, R1-102453, Beijing, China, Apr. 12-16, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, a. et al., "Muri: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.

* cited by examiner

MULTI-USER MULTIPLEXING OF ORTHOGONAL TIME FREQUENCY SPACE SIGNALS

CROSS REFERENCE TO RELATED APPLICATIONS

This patent document is a continuation of PCT Application No. PCT/US2017/046604, filed Aug. 11, 2017, entitled "MULTI-USER MULTIPLEXING OF ORTHOGONAL TIME FREQUENCY SPACE SIGNALS" which claims the benefits and priority of U.S. Provisional Patent Application No. 62/374,705, filed Aug. 12, 2016, entitled "MULTI-USER MULTIPLEXING OF ORTHOGONAL TIME FREQUENCY SPACE SIGNALS". The entire content of the before-mentioned patent applications is incorporated by reference as part of the disclosure of this application.

TECHNICAL FIELD

The present document relates to wireless communication, and more particularly, transmission and reception of multi-user signals in single-input-single-output (SISO) and multiple-input-multiple-output (MIMO) systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for multiplexing, in the uplink and/or downlink direction, signals from/to multiple user devices.

In one example aspect, a method for performing downlink transmissions from a transmitting device to multiple user devices using transmission resources from a multi-dimensional grid of resources is disclosed. The method includes logically partitioning the transmission resources into multiple segments, assigning, to a given user device of the multiple user devices, transmission resources of one or more of the multiple segments, and performing, using at least some of the assigned transmission resources for the given user device, a downlink transmission using an orthogonal time frequency space (OTFS) transformation on data or signals to be transmitted to the given user device.

In another aspect, a wireless communication method for performing uplink transmissions from multiple user devices using transmission resources from a multi-dimensional grid of resources to a receiving device is disclosed. The method includes logically partitioning the transmission resources into multiple segments, assigning, to a given user device of the multiple user devices, transmission resources of one or more of the multiple segments, and performing, an uplink transmission from the given user device using at least some of the assigned transmission resources for the given user device, wherein the uplink transmission includes data that has undergone an orthogonal time frequency space (OTFS) transform.

In yet another aspect, a method for performing transmissions between a wireless device to multiple user devices is disclosed. The method includes logically grouping the multiple user devices into a first group of user devices and a second group of user devices, allocating a first group of transmission resources to the first group of user devices and a second group of transmission resources to the second group of user devices by multiplexing along a first dimension of a first multi-dimensional representation of transmission resources, allocating, from the first group of transmission resources, transmissions resources to user devices in the first group by multiplexing along a second dimension in a second multi-dimensional representation of the transmission resources, and performing a transmission between the wireless device and at least one user device using corresponding allocated transmission resources.

In yet another aspect, a wireless communication method, implemented at a network-side equipment, for receiving an orthogonal time frequency space (OTFS) signal comprising a multiplex of uplink transmissions from multiple user equipment, is disclosed. The method includes performing joint equalization on the multiplex to generate jointly equalized symbols, extracting, from the jointly equalized symbols, symbols corresponding to a given transmitting device based on extrinsic information about transmission resource location of the symbols, demapping the extracted symbols and performing forward error correction to generate output bits, and generating a feedback signal based on the output bits for improving the joint equalization in a next iteration.

In yet another aspect, a method for receiving an orthogonal time frequency space (OTFS) signal comprising a multiplex of transmissions for multiple receiving devices is disclosed. The method includes performing joint equalization on the multiplex to generate jointly equalized symbols, extracting, from the jointly equalized symbols, symbols corresponding to one or more receiving devices, and demapping the extracted symbols and performing forward error correction to generate output bits, and generating a feedback signal based on the output bits for improving the joint equalization in a next iteration.

In yet another aspect, a wireless device comprising a processor configured to implement one of the above-described methods is disclosed.

In yet another aspect, a computer-readable memory storing instructions that, when executed by a processor, cause the processor to implement one of the described methods is disclosed.

These, and other, features and embodiments are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only.

Figure 1:
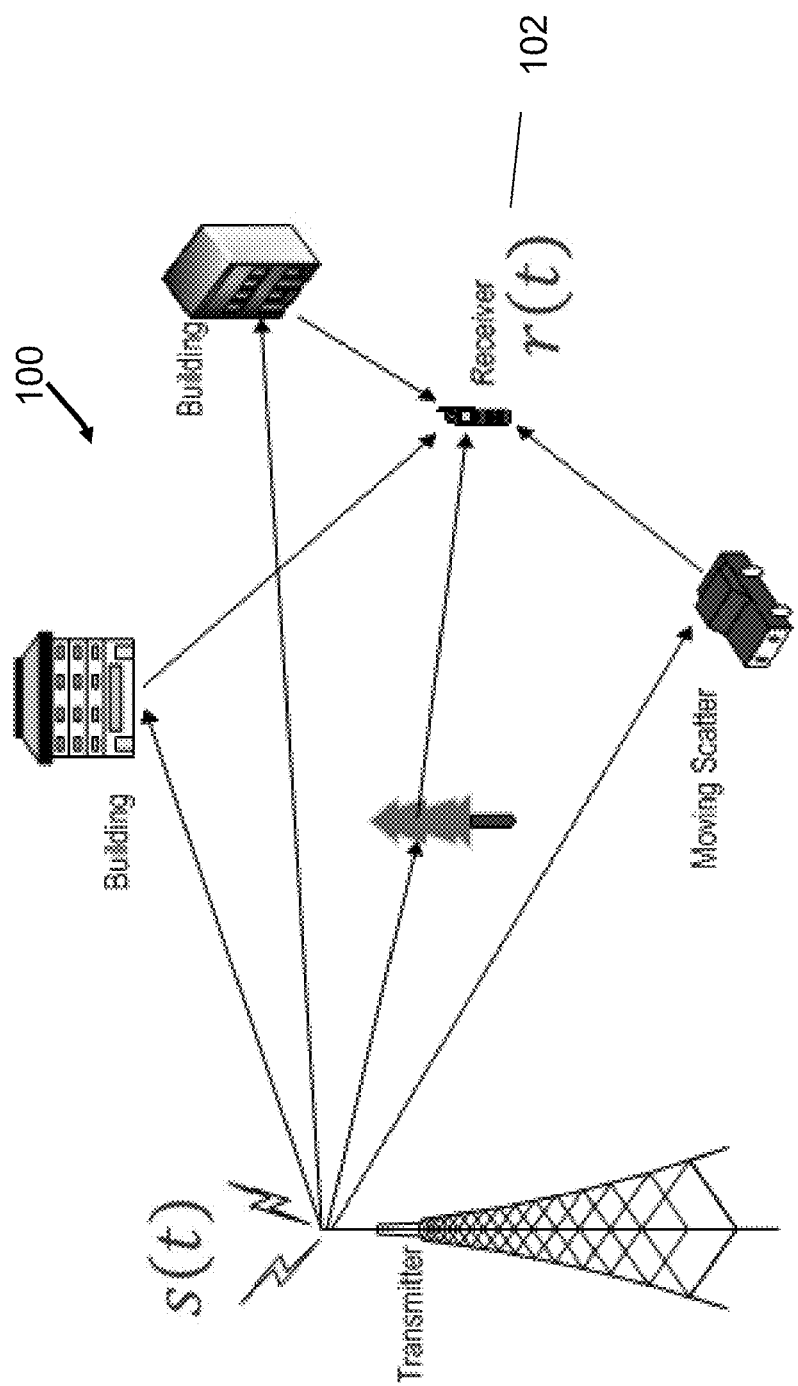
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

BRIEF INTRODUCTION

The orthogonal time frequency space (OTFS) transform may be used to transform constellation symbols placed on a delay-Doppler grid to symbols on a time-frequency grid. These time-frequency symbols may then be modulated using Orthogonal Frequency Division Multiplexing (OFDM) and transmitted over a fading channel of a wireless system.

Wireless systems are often configured to have a base station on the network side and multiple user devices (abbreviated as users) deployed in an area. The transmissions from the user devices to the base station are called uplink transmissions, while transmissions from the base station to the user devices are called downlink transmissions. To accommodate transmissions to and from the user devices, there are two multi-user schemes, which are often used in different communication systems:

Multi-user uplink—where different users are transmitting at the same time (subject to being time division multiplexed), sharing the bandwidth, but experiencing different channels and all the signals are received by a single receiver (e.g., a base station), which decodes all the users.

Multi-user downlink—where a single transmitter sends data to several different users over a shared bandwidth. Each user device receives a signal, which experiences a generally different channel and decodes only the data targeted to itself.

While the various transmission and reception techniques are described in the present document with reference to uplink and downlink transmissions, the techniques are also applicable to other situations when transmissions are made between a transmitting wireless device and multiple wireless devices in both directions. Such examples include, e.g., ad hoc networks that may be established among wireless devices.

When OTFS signal is used, the prevalent OFDM transmission technologies do not address ways that can effectively multiplex the OTFS transmissions. The techniques disclosed in this document can be used for multi-user to share and decode an OTFS signal.

While various embodiments are described with the example of a delay-Doppler domain or a time-frequency domain representation of transmission resources, in general, transmission bandwidth may be represented in multiple dimensions, with each of the multiple dimensions having an orthogonal relationship with other dimensions.

Multiplexing in the Delay-Doppler Domain

Figure 2:
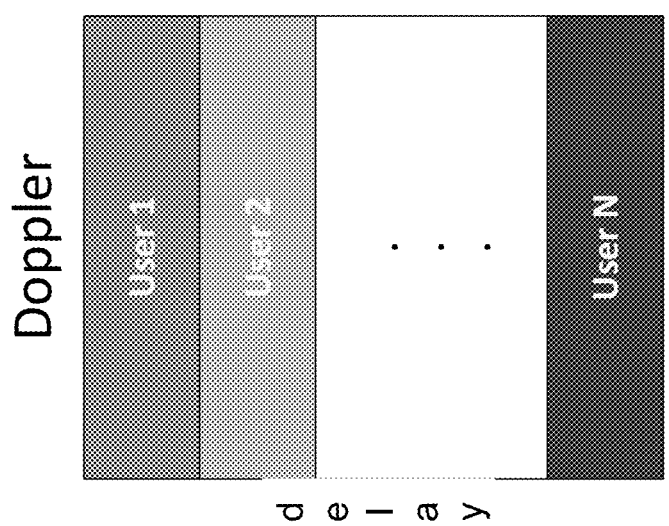
FIG. 2 shows an example of transmission resource allocation based on multiplexing in the delay-Doppler grid along the delay dimension.

One possible way to share an OTFS signal (or OTFS transmission resources) between multiple user devices is to multiplex the user devices in the delay-Doppler domain, meaning, to allocate different portions of the resource grid to different users. This allocation may be arbitrary, but to simplify the receiver, it may be better to multiplex the users along one of the grid dimensions, either along the delay or the Doppler dimension. FIG. 2 shows an example for multiplexing users in the delay-Doppler grid, along the delay dimension.

Multi-User Uplink Transmission Scheme

Figure 3:
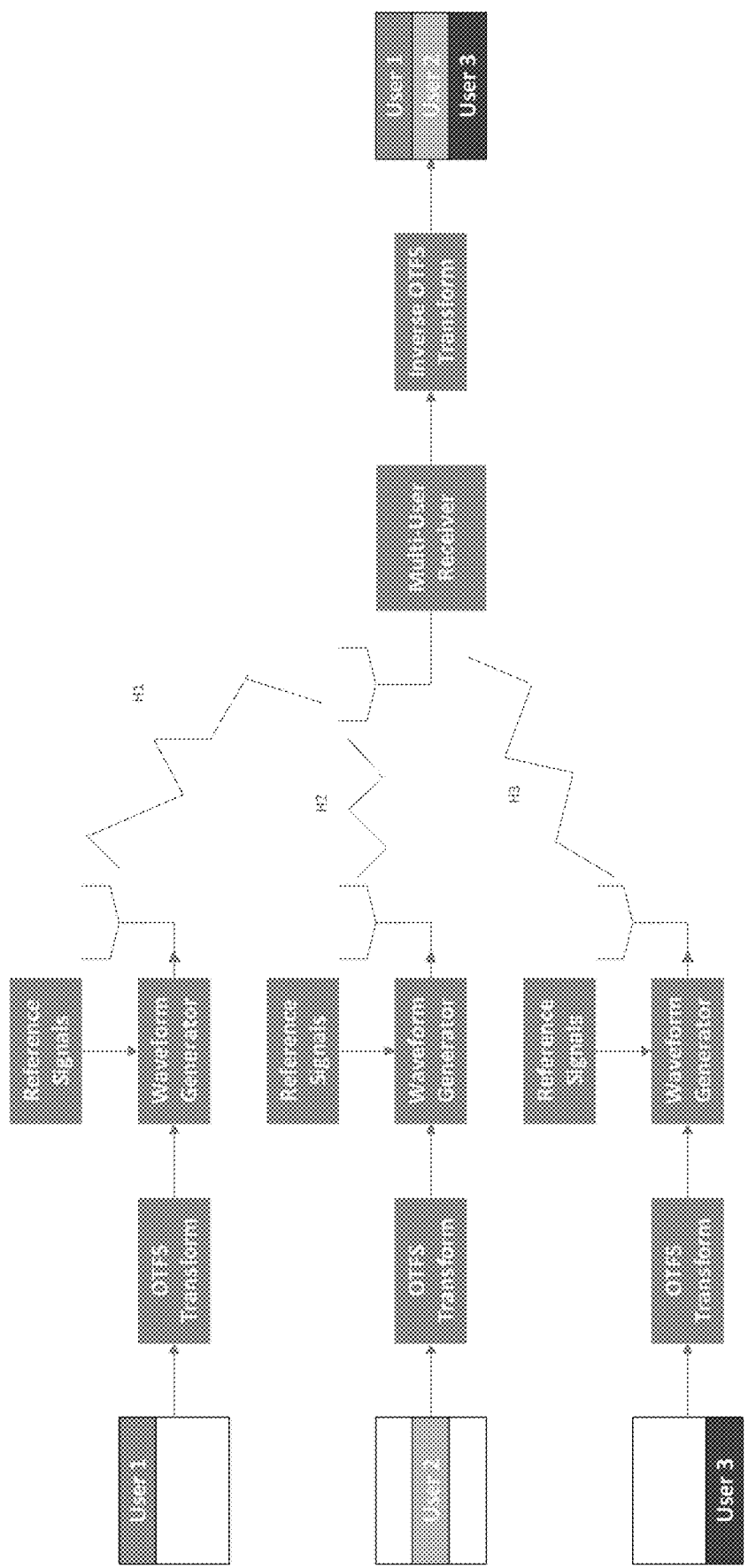
FIG. 3 shows an example of a multi-user uplink communication system.

FIG. 3 shows an example of 3 user devices (user 1, user 2 and user 3) multiplexed in the delay-Doppler grid (along delay). Each user occupies a different portion of the delay-Doppler grid, having the rest of the grid unallocated (zeros). Each user may add specific reference signals to its transmission to enable channel estimation at the receiver. The users are transmitted simultaneously over different channels ($H_1, \ldots, H_3$) and received together at a single receiver. After applying the inverse OTFS transform, the receiver's delay-Doppler grid contains all the received users. As depicted in FIG. 3, the uplink signals from a user device may be transformed using an OTFS transform into an OFDM signal. A waveform generator may assign transmissions resources to the OFDM signal along the time-frequency grid. In addition, the waveform generator may also include reference signals. The resulting signal may be transmitted to the multi-user receiver device. At the receiver device, the received signal may be inverse transformed using an OTFS inverse transform and the resulting signals may be demultiplexed into signals originating from the multiple user devices.

Examples of Multi-User Downlink Transmission Schemes

Figure 4:
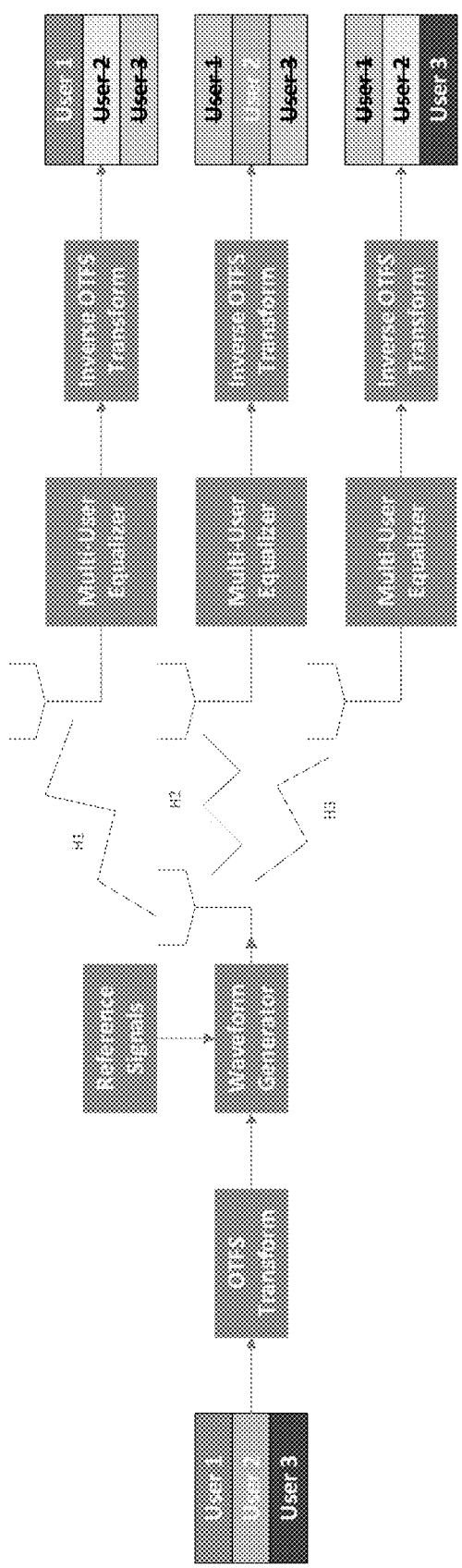
FIG. 4 shows an example of a multi-user downlink communication system.

FIG. 4 shows an example of 3 users sharing a transmission and received by 3 different receivers after experiencing 3 different channels. Each user decodes only its specific data. As depicted, the single transmission device may multiplex signals from multiple user devices, transform them into the OFDM time-frequency grid, optionally add reference signals and transmit to the user devices. At the user devices, each user device may receive the transmission, and extract the data that is intended for transmission to the user device.

Examples of Multi-User Iterative Receiver Embodiments

Figure 5:
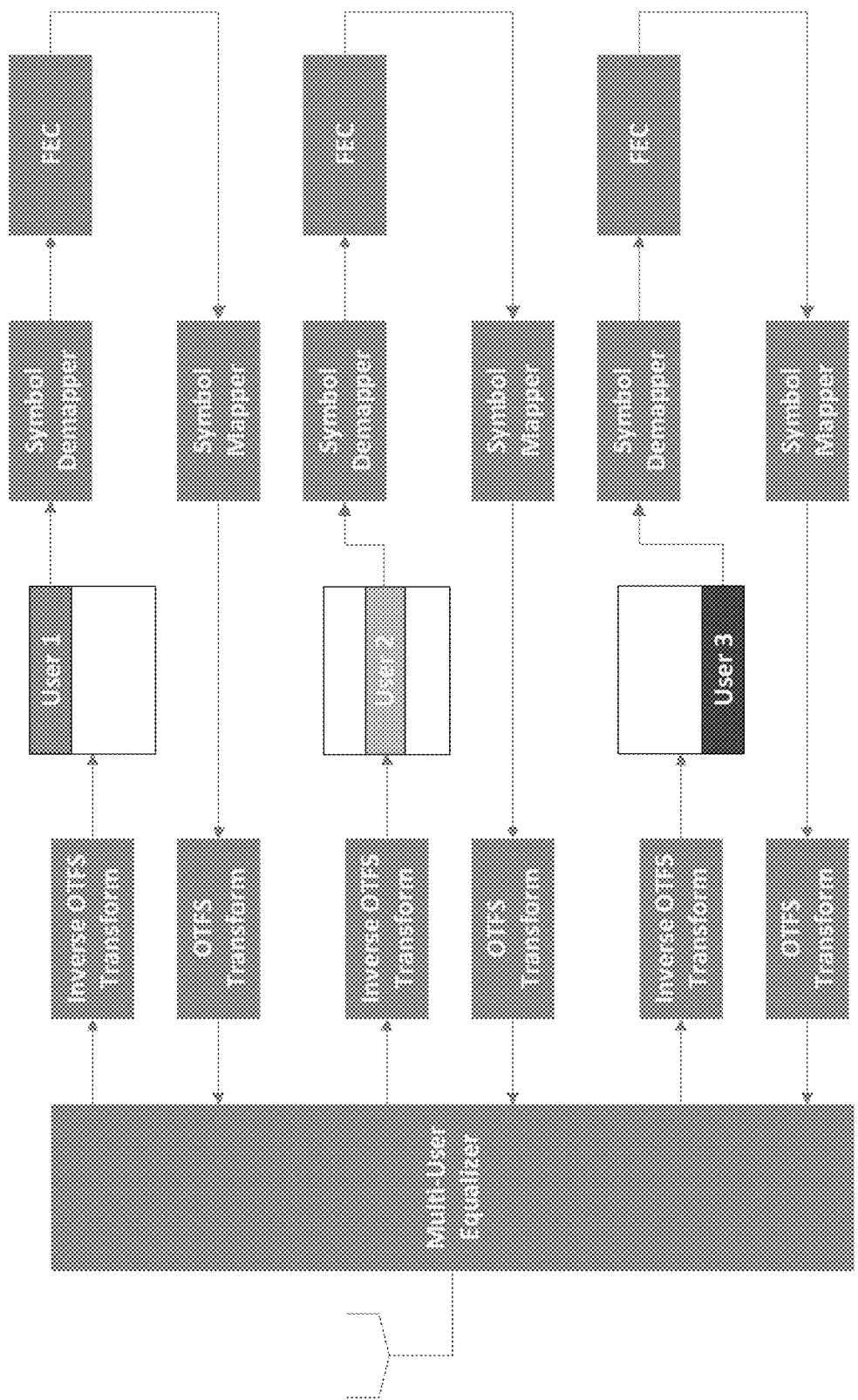
FIG. 5 is a block diagram of an example implementation of a multi-user iterative receiver.

One possible implementation of a multi-user receiver includes an iterative scheme, where an equalizer gets extrinsic prior information about the users' symbols. The extrinsic information may include information that allows the receiver device to successfully demultiplex a signal that includes transmissions from the multiple transmitting devices. For example, the extrinsic information may include a schedule allocated to the multiple transmitting devices. The equalizer may perform linear Minimum Mean Squared Error (MMSE) filtering for each user device to extract the corresponding estimated symbols on the time-frequency grid. Then, these symbols are transformed to the delay-Doppler grid using an inverse OTFS transform, converted to bit likelihoods and possibly forward error correction (FEC) decoded. From the FEC of each user, the likelihoods of the of coded bits are converted to symbols' prior information and transformed back to the time-frequency grid using an OTFS transform. The equalization of each specific user also may take into account the prior information of all the other users. FIG. 5 shows an example of such a receiver for three uplink users. An equivalent receiver for a downlink user may only include of a single processing chain for that specific target user.

Multiplexing in the Time-Frequency Domain

Figure 6:
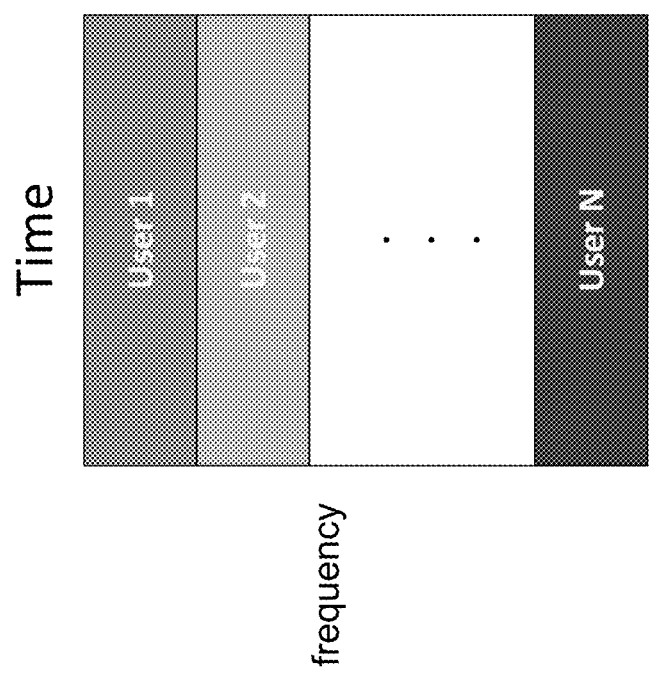
FIG. 6 shows an example of allocation of transmission resource in the time-frequency grid along the frequency dimension.
Figure 7:
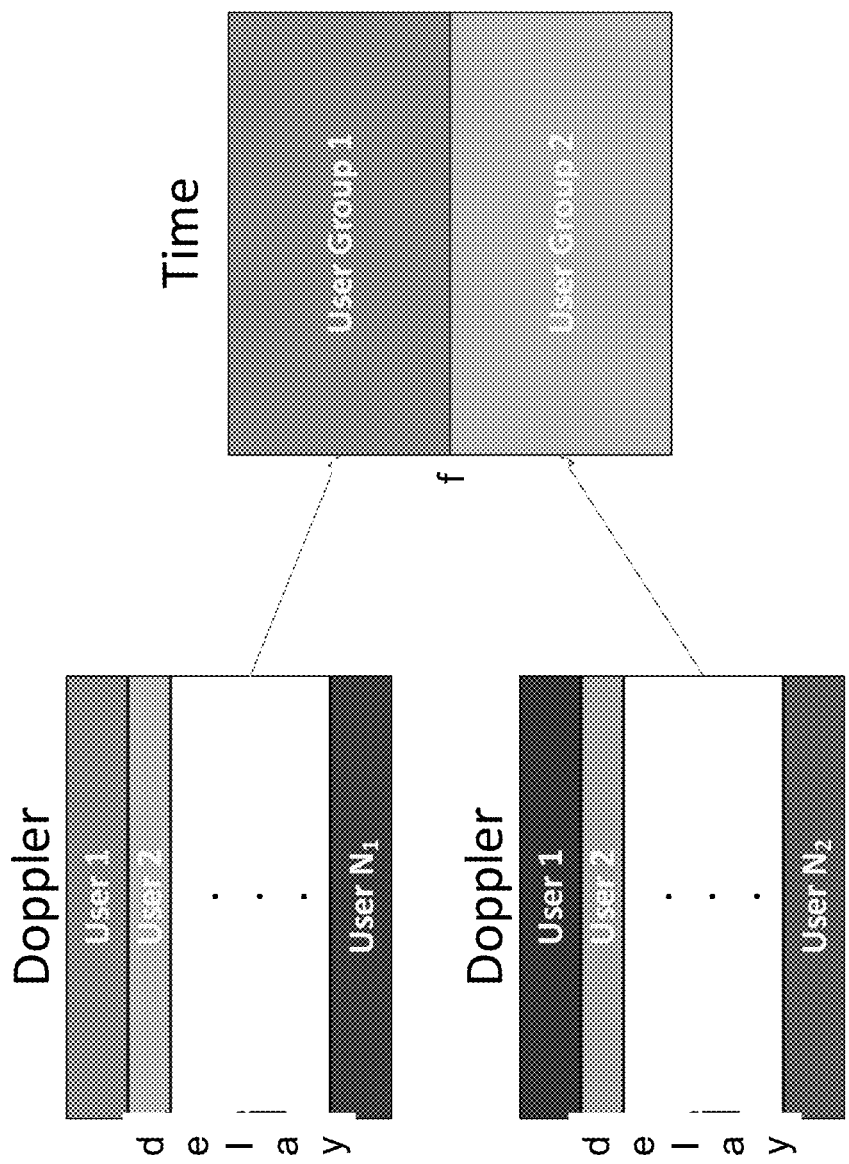
FIG. 7 shows an example of allocation of transmission resources for transmissions between one or more user devices and a wireless device by multiplexing both in the delay-Doppler domain and in the time-frequency domain.

In general, in various embodiments, other type of multiplexing is also possible, such as multiplexing users in the time-frequency grid (FIG. 6) or combining multiplexing in delay-Doppler and multiplexing in time-frequency (FIG. 7). In particular, as depicted in FIG. 7, in some embodiments, multiplexing may be achieved in two stages. In the first stage, transmissions from multiple user devices in a first group may be multiplexed in the delay dimension and a second group may be separately multiplexed in the delay dimension (or another suitable dimension along a multi-dimensional resource grid). The resulting signal output may then be multiplexed in the frequency domain as the first user group (User group 1) and the second user group (user group 2). In FIG. 7, the user devices 1, 2, and so on in the first user group and the second user groups may represent different user devices. In general, the user groups may have a different number of user devices (N1 and N2, where N1 and N2 are equal to 1 or more).

Figure 8:
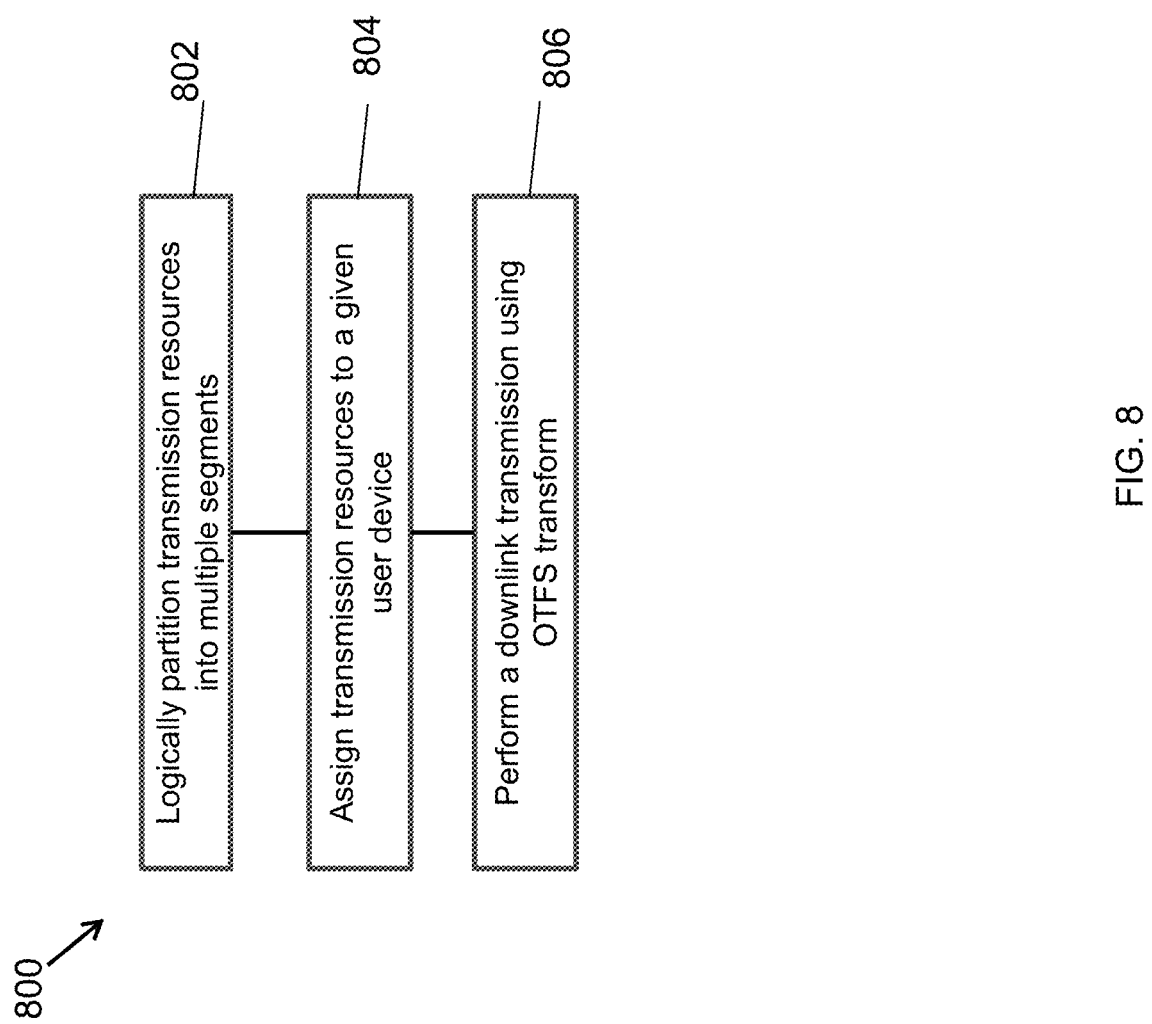
FIG. 8 shows a flowchart of an example wireless communication downlink transmission method.

FIG. 8 is a flowchart of an example method 800 for performing downlink transmissions from a transmitting device to multiple user devices using transmission resources from a multi-dimensional grid of resources. The method includes logically partitioning (802) the transmission resources into multiple segments, assigning (804), to a given user device of the multiple user devices, transmission resources of one or more of the multiple segments, and performing (806), using at least some of the assigned transmission resources for the given user device, a downlink transmission using an orthogonal time frequency space (OTFS) transformation on data or signals to be transmitted to the given user device.

In some embodiments, the logically partitioning the transmission resource includes multiplexing the transmission resources along one dimension of the multi-dimensional grid of resources. In some embodiments, the multi-dimensional grid of resources includes a delay dimension and a Doppler dimension and wherein the multiplexing the transmission resources includes multiplexing the transmission resources along the delay dimension. Alternatively, in some embodiments, the multi-dimensional grid or resources includes a delay dimension and a Doppler dimension and wherein the multiplexing the transmission resources includes multiplexing the transmission resources along the Doppler dimension. In some embodiments, the multi-dimensional grid or resources includes a time dimension and a frequency dimension and wherein the multiplexing the transmission resources includes multiplexing the transmission resources along the frequency dimension. In some embodiments, the multi-dimensional grid or resources includes a time dimension and a frequency dimension and wherein the multiplexing the transmission resources includes multiplexing the transmission resources along the time dimension.

In some embodiments, the downlink transmission includes a reference signal to enable channel estimation by the given user device. For example, the reference signal is based on an identity of the given user device. In some embodiments, the multi-dimensional grid may represent a two-dimensional resource grid such as the time-frequency grid or the delay-Doppler grid of resources. In some embodiments, the partitioning of resources may be non-uniformly spaced in the multi-dimensional grid of resources. For example, some user devices may be allocated more transmission resources than other devices, based on their application layer bandwidth requests.

Figure 9:
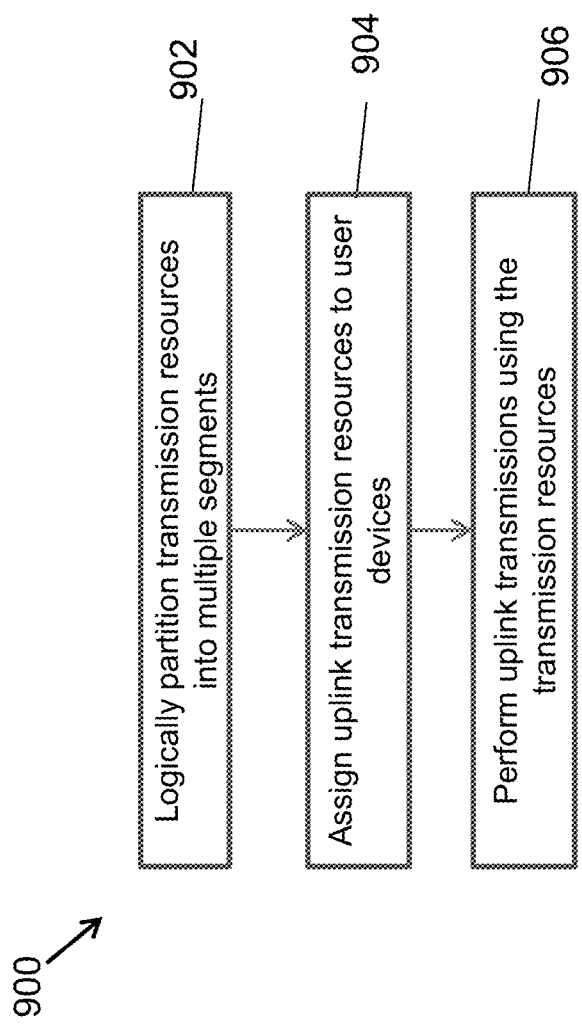
FIG. 9 shows a flowchart of an example wireless communication uplink transmission method.

FIG. 9 is a flowchart of an example method 900 for performing uplink transmissions from multiple user devices using transmission resources from a multi-dimensional grid of resources to a receiving device. The method 900 includes logically partitioning (902) the transmission resources into multiple segments, assigning (904), to a given user device of the multiple user devices, transmission resources of one or more of the multiple segments, and performing (906), an uplink transmission from the given user device using at least some of the assigned transmission resources for the given user device, wherein the uplink transmission includes data that has undergone an orthogonal time frequency space (OTFS) transform.

In some embodiments, the logically partitioning the transmission resource includes multiplexing the transmission resources along one dimension of the multi-dimensional grid of resources. In some embodiments, the multi-dimensional grid or resources includes a delay dimension and a Doppler dimension and wherein the multiplexing the transmission resources includes multiplexing the transmission resources along the delay dimension. In some embodiments, the multi-dimensional grid or resources includes a delay dimension and a Doppler dimension and wherein the multiplexing the transmission resources includes multiplexing the transmission resources along the Doppler dimension. In some embodiments, the two dimensional grid or resources includes a delay dimension and a Doppler dimension and wherein the multiplexing the transmission resources includes multiplexing the transmission resources along the frequency dimension. In some embodiments, the two dimensional grid or resources includes a delay dimension and a Doppler dimension and wherein the multiplexing the transmission resources includes multiplexing the transmission resources along the time dimension.

In some embodiments the uplink transmission includes a reference signal to enable channel estimation by the receiving device. The reference signal may be based on an identity of the receiving signal. For example, the reference signal may be specifically designed to allow the receiving design to perform channel equalization, and other optimization functions.

Figure 10:
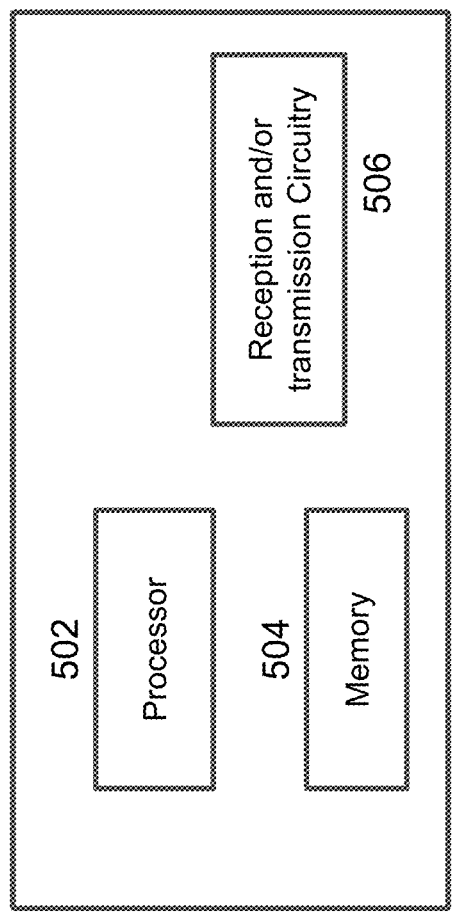
FIG. 10 shows an example of a wireless transceiver apparatus.

FIG. 10 shows an example of a wireless transceiver apparatus 500. The apparatus 500 may be used to implement method 200. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

Figure 11:
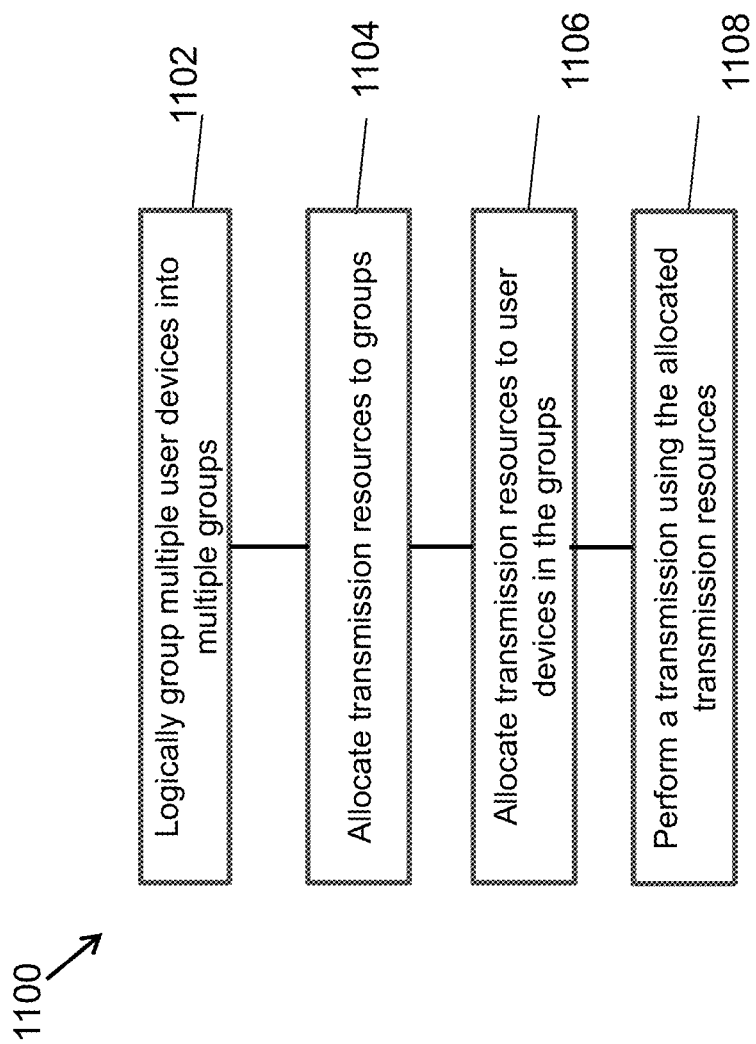
FIG. 11 shows a flowchart of an example of a wireless communication method.

FIG. 11 is a flowchart for a method 1100 for performing transmissions between a wireless device to multiple user devices. The method 1100 includes logically grouping (1102) the multiple user devices into a first group of user devices and a second group of user devices, allocating (1104) a first group of transmission resources to the first group of user devices and a second group of transmission resources to the second group of user devices by multiplexing along a first dimension of a first multi-dimensional representation of transmission resources, allocating (1106), from the first group of transmission resources, transmissions resources to user devices in the first group by multiplexing along a second dimension in a second multi-dimensional representation of the transmission resources, and performing (1108) a transmission between the wireless device and at least one user device using corresponding allocated transmission resources.

In some embodiments, the first multi-dimensional representation comprises a time-frequency representation and the second multi-dimensional representation comprises a delay-Doppler representation. In various embodiments, the first dimension may be frequency or time dimension and the second dimension may be delay or Doppler dimension. In some embodiments, the user groups may include one device, or more than one devices.

Figure 12:
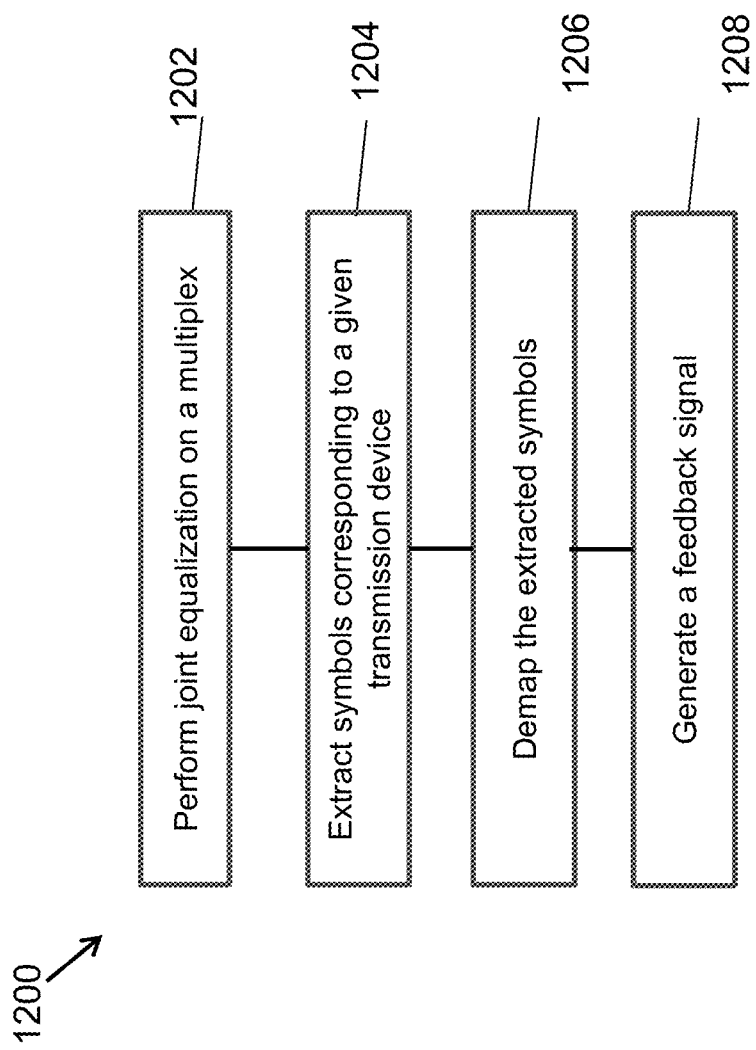
FIG. 12 shows a flowchart of an example of a wireless communication method.

FIG. 12 is a flowchart of a method 1200 for receiving an orthogonal time frequency space (OTFS) signal comprising a multiplex of transmissions from multiple transmitting devices. The method 1200 includes performing (1202) joint equalization on the multiplex to generate jointly equalized symbols, extracting (1204), from the jointly equalized symbols, symbols corresponding to a given transmitting device based on extrinsic information about transmission resource location of the symbols, demapping (1206) the extracted symbols and performing forward error correction to generate output bits, and generating (1208) a feedback signal based on the output bits for improving the joint equalization in a next iteration.

In some embodiments, the operation of the generating the feedback signal includes performing symbol mapping followed by OTFS transforming results of the symbol mapping to generate the feedback signal. In some embodiments, the operation of generating the output bits for the user device includes performing inverse OTFS modulation.

Figure 13:
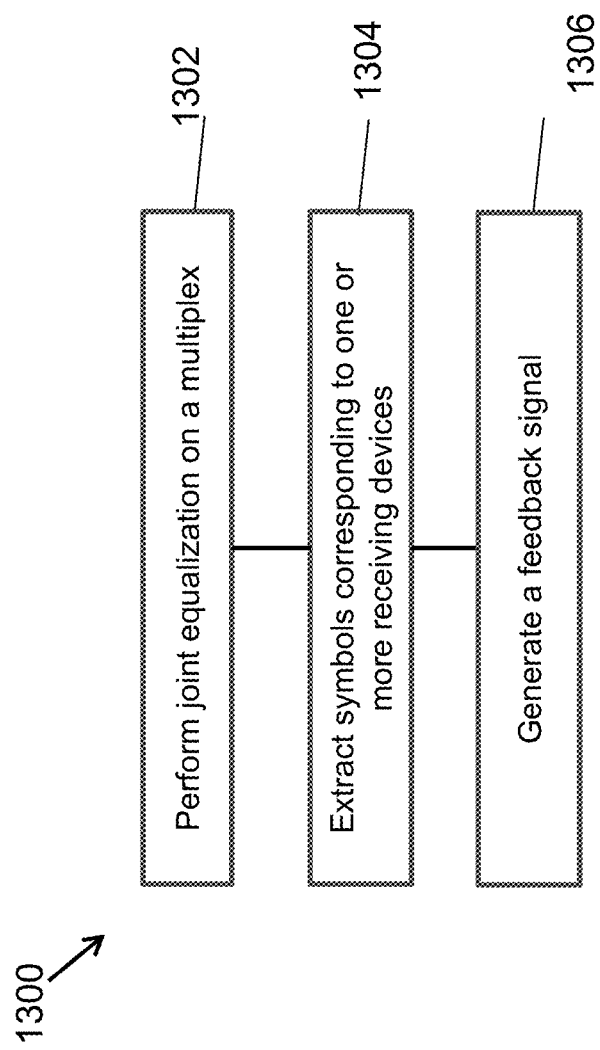
FIG. 13 shows a flowchart of an example of a wireless communication method.

FIG. 13 is a flowchart representation of a method 1300 for receiving an orthogonal time frequency space (OTFS) signal comprising a multiplex of transmissions for multiple receiving devices. The method 1300 includes performing (1302) joint equalization on the multiplex to generate jointly equalized symbols, extracting (1304), from the jointly equalized symbols, symbols corresponding to one or more receiving devices, and demapping the extracted symbols and performing forward error correction to generate output bits, and generating (1306) a feedback signal based on the output bits for improving the joint equalization in a next iteration.

In some embodiments, the generating the feedback signal includes performing symbol mapping followed by OTFS transforming results of the symbol mapping to generate the feedback signal. In some embodiments, the operation of generating the output bits for the receiving device includes performing inverse OTFS modulation.

It will be appreciated that the disclosed techniques can be used to improve reception performance of wireless apparatus and/or reduce complexity of implementation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method for performing downlink transmissions from a transmitting device to multiple user devices using transmission resources from a multi-dimensional grid of resources, comprising:
   logically partitioning the transmission resources into multiple segments;
   assigning, to a given user device of the multiple user devices, transmission resources of one or more of the multiple segments; and
   performing, using at least some of the assigned transmission resources for the given user device, a downlink transmission using an orthogonal time frequency space (OTFS) transformation on data or signals to be transmitted to the given user device,
   wherein the logical partitioning of the transmission resources is non-uniformly spaced in the multi-dimensional grid of resources.

2. The method of claim 1, wherein the logically partitioning the transmission resource includes multiplexing the transmission resources along one dimension of the multi-dimensional grid of resources.

3. The method of claim 2, wherein the multi-dimensional grid of resources includes a delay dimension and a Doppler dimension and wherein the multiplexing the transmission resources includes multiplexing the transmission resources along the delay dimension.

4. The method of claim 2, wherein the multi-dimensional grid of resources includes a delay dimension and a Doppler dimension and wherein the multiplexing the transmission resources includes multiplexing the transmission resources along the Doppler dimension.

5. The method of claim 2, wherein the multi-dimensional grid or resources includes a time dimension and a frequency dimension and wherein the multiplexing the transmission resources includes multiplexing the transmission resources along the frequency dimension.

6. The method of claim 2, wherein the multi-dimensional grid or resources includes a time dimension and a frequency dimension and wherein the multiplexing the transmission resources includes multiplexing the transmission resources along the time dimension.

7. The method of claim 1, wherein the downlink transmission includes a reference signal to enable channel estimation by the given user device.

8. The method of claim 7, wherein the reference signal is based on an identity of the given user device.

9. The method of claim 1, wherein the multi-dimensional grid of resources comprises a two-dimensional grid of resources.

10. The method of claim 1, wherein the multi-dimensional grid of resource comprises a delay dimension and a Doppler dimension.

11. A wireless communication method for performing uplink transmissions from multiple user devices using transmission resources from a multi-dimensional grid of resources to a receiving device, comprising:
   logically partitioning the transmission resources into multiple segments;
   assigning, to a given user device of the multiple user devices, transmission resources of one or more of the multiple segments; and
   performing, an uplink transmission from the given user device using at least some of the assigned transmission resources for the given user device, wherein the uplink transmission includes data that has undergone an orthogonal time frequency space (OTFS) transform,
   wherein the logical partitioning of the transmission resources is non-uniformly spaced in the multi-dimensional grid of resources.

12. The method of claim 11, wherein the logically partitioning the transmission resource includes multiplexing the transmission resources along one dimension of the multi-dimensional grid of resources.

13. The method of claim 12, wherein the multi-dimensional grid or resources includes a delay dimension and a Doppler dimension and wherein the multiplexing the transmission resources includes multiplexing the transmission resources along the delay dimension.

14. The method of claim 12, wherein the multi-dimensional grid or resources includes a delay dimension and a Doppler dimension and wherein the multiplexing the transmission resources includes multiplexing the transmission resources along the Doppler dimension.

15. The method of claim 12, wherein the two dimensional grid or resources includes a delay dimension and a Doppler dimension and wherein the multiplexing the transmission resources includes multiplexing the transmission resources along the frequency dimension.

16. The method of claim 12, wherein the two dimensional grid or resources includes a delay dimension and a Doppler dimension and wherein the multiplexing the transmission resources includes multiplexing the transmission resources along the time dimension.

17. The method of claim 11, wherein the uplink transmission includes a reference signal to enable channel estimation by the receiving device.

18. The method of claim 17, wherein the reference signal is based on an identity of the transmitting device.

* * * * *